(12) United States Patent
Gaza et al.

(10) Patent No.: US 6,936,830 B2
(45) Date of Patent: Aug. 30, 2005

(54) OPTICALLY STIMULATED LUMINESCENCE RADIATION DOSIMETRY METHOD TO DETERMINE DOSE RATES DURING RADIOTHERAPY PROCEDURES

(75) Inventors: Razvan Gaza, Stillwater, OK (US); Mark S. Akselrod, Stillwater, OK (US); Stephen W. S. McKeever, Stillwater, OK (US)

(73) Assignees: The Board of Regents for Oklahoma State University, Stillwater, OK (US); Landauer, Inc., Glenwood, IL (US)

( * ) Notice: Subject to any disclaimer, the term of this patent is extended or adjusted under 35 U.S.C. 154(b) by 0 days.

(21) Appl. No.: 10/852,584

(22) Filed: May 24, 2004

(65) Prior Publication Data
US 2004/0238757 A1 Dec. 2, 2004

Related U.S. Application Data
(60) Provisional application No. 60/473,280, filed on May 23, 2003.

(51) Int. Cl.$^7$ .......................... H05B 33/00; F21V 9/16; G01J 1/58; G01T 1/10; G21H 3/02
(52) U.S. Cl. .............................. 250/484.5; 250/484.4; 250/459.1
(58) Field of Search .......................... 250/484.5, 484.4, 250/484.2, 368, 483.1, 361 R, 459.1

(56) References Cited

U.S. PATENT DOCUMENTS

| | | | |
|---|---|---|---|
| 3,412,248 A | * 11/1968 | Kastner et al. | 250/484.5 |
| 4,507,562 A | * 3/1985 | Gasiot et al. | 250/484.5 |
| 5,030,834 A | 7/1991 | Lindmayer et al. | 250/484.1 |
| 5,091,653 A | 2/1992 | Creager et al. | 250/484.1 |
| 5,567,948 A | 10/1996 | Miller | 250/484.5 |
| 5,569,927 A | 10/1996 | Miller | 250/484.5 |
| 5,731,590 A | * 3/1998 | Miller | 250/484.5 |
| 5,732,590 A | 3/1998 | Heitze et al. | 72/455 |
| 5,811,822 A | 9/1998 | Huston et al. | 250/484.4 |

(Continued)

OTHER PUBLICATIONS

McKeever, S.W. "Optically Stimulated Luminescence Dosimetry", Nuclear Instruments and Methods in Physics Research, Section B: Beam Interactions with Materials and Atoms, vol. 184, no. 1–2 (Sep. 2001), pp. 29–54.*

Markey et al. "Time–Resolved Optically Stimulated Luminescence from alpha–AI2O3:C", Radiation Measurements, vol. 24, no. 4 (Oct. 1995), pp. 457–463.*

Bloom, D. et al. "Characterization of $Al_2O_3$ single crystals grown by the laser–heated pedestal growth technique for potential use in radiation dosimetry." Radiation Measurements. vol. 37, Issue 2, pp. 141–149, 2003. (Abstract).

(Continued)

Primary Examiner—David Porta
Assistant Examiner—Frederick F. Rosenberger
(74) Attorney, Agent, or Firm—Fellers, Snider, Blankenship, Bailey & Tippens, P.C.

(57) ABSTRACT

There is provided a system and method for estimating radiation exposure in real time or in near-real time while a dosimeter is being irradiated. In the preferred arrangement, OSL will be used to calculate estimates of the radiation dose rate, preferably by using comparisons between illumination values measured during and after lighting the dosimeter with a laser light of a predetermined frequency. A first preferred embodiment utilizes quasi-equilibrium OSL intensity with periodic stimulation during continuous irradiation. Another preferred embodiment utilizes the amplitude of the transient OSL signal during periodic stimulation. Another preferred embodiment utilizes the difference between the OSL intensity at the end of one stimulation period and the beginning of the next. Finally, another preferred monitors the time constant for the return of the transient OSL signal to equilibrium, following either a change in dose rate or during a periodic optical stimulation.

22 Claims, 5 Drawing Sheets

U.S. PATENT DOCUMENTS

| | | | | |
|---|---|---|---|---|
| 5,818,056 A | * | 10/1998 | Pass | 250/458.1 |
| 5,892,234 A | | 4/1999 | McKeever et al. | 250/459.1 |
| 5,962,857 A | | 10/1999 | McKeever et al. | 250/484.5 |
| 6,087,666 A | | 7/2000 | Huston et al. | 250/484.5 |
| 6,316,782 B1 | | 11/2001 | Akselrod et al. | 250/582 |
| 6,414,324 B1 | | 7/2002 | Colyott et al. | 250/484.5 |
| 6,479,829 B1 | * | 11/2002 | Katagiri | 250/484.5 |

OTHER PUBLICATIONS

Polf, J.C. et al. "A real–time, fibre optic dosimetry system using $Al_2O_3$ fibers." *Radiation Protection Dosimetry*. vol. 100, pp. 301–304, 2002. (Abstract).

Bloom, D. et al. "Characterization of $Al_2O_3$ single crystals grown by the laser–heated pedestal growth technique for potential use in radiation dosimetry." *Radiation Measurements*. vol. 37, Issue 2, pp. 141–149, 2003.

Gaza, R. et al. "A fiber–dosimetry method based on OSL from $Al_2O_3$: C for radiotherapy applications." *Radiation Measurements*. vol. 38, pp. 809–812, 2004.

Polf, J.C. et al. "A real–time, fibre optic dosimetry system using $Al_2O_3$ fibers." *Radiation Protection Dosimetry*. vol. 100, pp. 301–304, 2002.

* cited by examiner

OPTICALLY STIMULATED LUMINESCENCE RADIATION DOSIMETRY METHOD TO DETERMINE DOSE RATES DURING RADIOTHERAPY PROCEDURES

CROSS REFERENCE TO RELATED APPLICATION

This application claims the benefit of U.S. Provisional Application No. 60/473,280, which application was filed with the Patent and Trademark Office on May 23, 2003, which application is hereby incorporated by reference.

FIELD OF THE INVENTION

This invention relates generally to methods for using Optically Stimulated Luminescence (OSL) to determine radiation dose quantities and, more specifically, improved methods for using OSL to determine integrated doses and dose rates.

BACKGROUND OF THE INVENTION

Luminescence techniques in radiation dosimetry have traditionally been dominated by thermal methods in which a sample (a thermoluminescence dosimeter, or TLD) is exposed to radiation and is then heated in the dark. At a certain temperature, or in a certain temperature range (either of which is dependent upon the material used and the detailed parameters of the heating procedure), luminescence is emitted from the material. The intensity (for example, the integrated light emission between two specified temperatures) is related, by calibration procedures, to the original absorbed dose of radiation. This method of radiation dosimetry has been described in the literature, and has been in general usage, for approximately four decades.

However, in many circumstances optically stimulated luminescence (OSL) has proven to be a superior method of measuring radiation dose. Generally speaking, OSL methods illuminate a previously irradiated dosimeter with light of a particular frequency and intensity. This exposure excites light production within the dosimeter by transfer of charges from traps to luminescence centers. Then, by measuring the intensity and duration of the resulting luminescence signal that is emitted from the dosimeter, an accurate measure may be obtained of the amount of radiation to which the dosimeter was exposed.

As useful as OSL has proven to be, its conventional application has certain shortcomings. More particularly, there is a general departure from linearity in the luminescence/dose curve at higher dose levels and it is susceptible to saturation effects. Further, conventional OSL is not suitable for use in real-time measurement of radiation dose such as would be useful in the treatment of medical disorders by radiation. Instead, conventional OSL dosimetry attempts to determine absorbed doses only after the radiation exposure has ceased using post-irradiation analysis of the OSL signal.

Methods and dosimeters employing optically stimulated luminescence in the detection of radiation exposures in various configurations are described in U.S. Pat. Nos. 5,030,834; 5,091,653; 5,567,948; 5,569,927; 5,732,590; 5,811,822; 5,892,234; 5,962,857; 6,087,666, 6,316,782; and 6,414,324, which patents are fully incorporated herein by reference as if set out at this point.

Heretofore, as is well known in the radiation dosimetry industry, there has been a need for an invention to address and solve the above-described problems. Specifically it should now be recognized, as was recognized by the present inventors, that there exists, and has existed for some time, a very real need for a system and method that would address the issue of determining the absorbed radiation dose in real time during the radiation exposure using OSL.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a system and method for obtaining measurements of radiation dose, and dose rate, and the like in real-time using OSL and, more particularly, for obtaining OSL measurements in near-real-time or real-time while irradiation of a suitable dosimeter is taking place.

In general, a preferred method is herein provided for the determination of radiation doses and dose rates using the OSL signal from an $Al_2O_3$ detector simultaneous with the irradiation. Normally OSL is used in integrating mode; that is, the OSL signal at any point in time is taken to be proportional to the net accumulated trapped charge up to that point. The net accumulated trapped charge is in turn proportional to the total integrated dose absorbed by the dosimeter to that point. This assumes, however, that there have been no previous OSL readings of the sample until that point. In contrast, when used in real time, a continual set of periodic individual OSL measurements is taken and therefore previous OSL readings will deplete the trapped charge concentration such that any one OSL reading is no longer directly proportional to the total absorbed dose to that point. This effect needs to be taken into account when interpreting the OSL reading at any given time. Thus, any given OSL signal is the net result of the total irradiation history of the sample to that point, and the number of previous stimulations (OSL readings) of the sample to that point.

According to a first preferred embodiment there is provided a method of real-time determination of the dose rate during irradiation using OSL that utilizes a quasi-equilibrium (i.e., steady state) OSL intensity ($I_{SS}$) with periodic stimulation during continuous irradiation.

According to another preferred embodiment, there is provided a method of real-time determination of the dose and dose rate of a dosimeter that utilizes the amplitude (A) of the transient OSL signal during periodic stimulation.

According to still another preferred embodiment, there is provided a method of real-time determination of the radiation dose and dose rate that utilizes the difference (Δ) between the OSL intensity at the end of one stimulation period and the beginning of the next.

Finally, there is provided still another preferred embodiment wherein the time constant (τ) is monitored for the return of the transient OSL signal to equilibrium, following either a change in dose rate or during a periodic optical stimulation.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments

DESCRIPTION OF THE PREFERRED EMBODIMENTS

Figure 1:
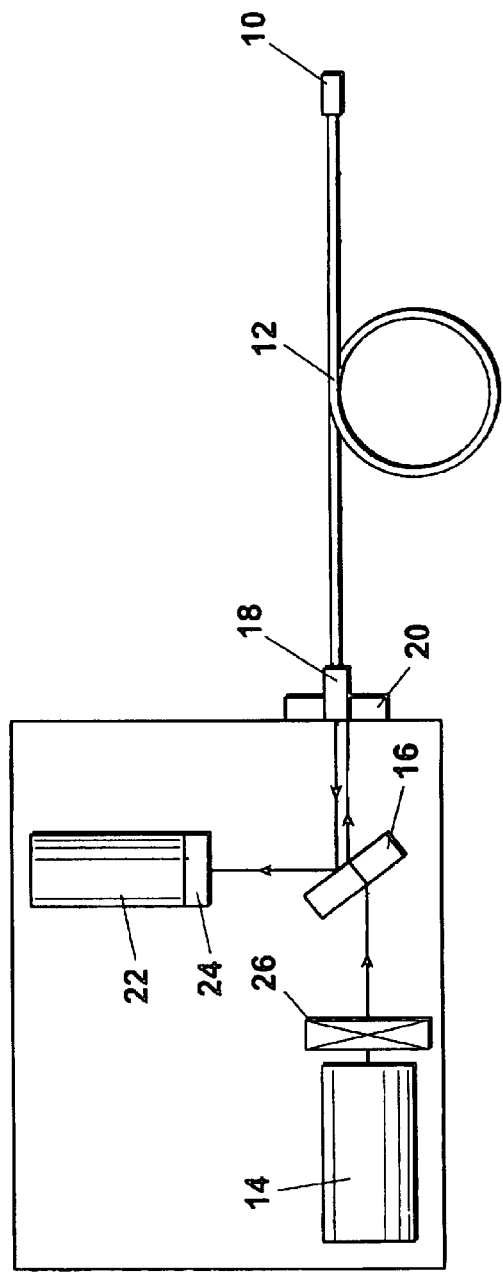
FIG. 1 contains a schematic illustration of a preferred apparatus for use with the instant invention.

Referring now to the drawings, wherein like reference numerals indicate the same parts throughout the several views, there is provided a method for performing OSL radiation dosimetry to determine radiation doses and dose rates during radiotherapy procedures.

By way of summary, the instant method for the determination of dose rates in real time during irradiation is based on the use of the optically stimulated luminescence (OSL) signal from an $Al_2O_3$ detector simultaneous with the irradiation of that detector. General methods and dosimeters employing optically stimulated luminescence in the detection of radiation exposures have been previously described in U.S. Pat. Nos. 5,030,834; 5,091,653; 5,567,948; 5,569,927; 5,732,590; 5,811,822; 5,892,234; 5,962,857; 6,087,666, 6,316,782; and 6,414,324, which patents are incorporated herein by reference as if fully set out at this point.

As noted above, normally OSL is used in integrating mode. That is, the OSL signal at any point in time is taken to be proportional to the net accumulated trapped charge up to that point. The net accumulated trapped charge is in turn proportional to the total integrated dose absorbed by the dosimeter to that point. This assumes, however, that there have been no previous OSL readings of the sample until that point. In contrast, when used in real time, a continual set of periodic individual OSL measurements is taken and, therefore, previous OSL readings will deplete the trapped charge concentration such that any one OSL reading is no longer directly proportional to the total absorbed dose to that point. This effect needs to be taken into account when interpreting the OSL reading at any given time. Thus, any given OSL signal is the net result of the total irradiation history of the sample to that point, and the number of previous stimulations (OSL readings) of the sample to that point.

Since the particular applications of interest in this disclosure primarily include situations wherein the dose rate is not constant and the measurements are required in as short a time as possible (i.e. as close to continuous real-time measurements as possible), the instant techniques focused on algorithms that determine dose rate, rather than integrated dose, although dose may also be extracted via the methods described herein. This problem is approached herein by stimulating the sample simultaneous with irradiation and applying one of several possible algorithms to relate the measured luminescence to dose rate. Each of these approaches will be discussed in turn below.

Generally speaking, each of the methods discussed herein for determining the dose rate during irradiation of an OSL dosimeter utilizes a method of monitoring the luminescence from the dosimeter during irradiation, and of stimulating the dosimeter with light (e.g. from a laser beam) during irradiation. According to one preferred embodiment, attaching the dosimeter to the distal end of a fiber optic cable and inserting the dosimeter into the radiation field to be measured can form a suitable arrangement. Light, preferably from a laser (at a first wavelength), is then directed down the fiber from the proximal end. Luminescence from the detector (at a second wavelength) is directed back along the fiber to a light detector (for example, a photomultiplier tube). Discrimination between the stimulation (laser) light and the luminescence (OSL) light is achieved via the use of suitable optical filters to distinguish between the said two different wavelengths.

With such an arrangement, the signal monitored by the light detector is the sum of the luminescence stimulated by the laser light (i.e. the OSL signal) and the prompt luminescence stemming from either or both of the following two sources; radioluminescence (RL) and Cerenkov luminescence (CkL). As is well known to those of ordinary skill in the art, the RL and CkL signals originate not only in the dosimeter, but also in that portion of the fiber optic cable that is placed within the radiation field. The OSL signal, however, stems only from the dosimeter in question. Therefore, higher spatial resolution is achieved only if the OSL signal can be separated from the RL and CkL signals. This is normally achieved by periodic stimulation of the dosimeter with the laser such that during stimulation the OSL+RL+CkL signals are measured, whereas between the laser stimulation pulses only the RL+CkL signals are measured. Thus, by subtracting the luminescence signal measured during the laser-off periods from that measured during the laser-on period, the OSL signal alone can be separated. Those of ordinary skill in the art will recognize that such subtraction (standing alone) is a conventional approach to the measurement of OSL in such situations, as already described in the literature, for example U.S. Pat. No. 5,091,653.

Preferred Measuring Apparatus

The equipment and method used for measuring the OSL signal during irradiation is preferably as follows. An $Al_2O_3$ single crystal dosimeter is connected to the end of a fiber optic cable. The crystal is placed inside of a radiation field. Light, for example, from a Nd:YAG laser (532 nm), is transmitted down the fiber to stimulate the crystal. The particular laser light frequency that is used is matched to the choice of the luminescent material in a manner well known to those skilled in the art. Of course, in practice the laser may not be Nd:YAG and the wavelength need not necessarily be 532 nm, depending on the particular choice of the luminescent detector. Similarly, the luminescent detector need not be comprised of $Al_2O_3$ and other detector materials may be used in a similar way to that described herein. The luminescent material should have radiation-induced optical absorption within the wavelength range of the optical stimulation.

Luminescence from the crystal/dosimeter is transmitted back up the fiber and is directed into a light detector, (e.g. a photomultiplier tube (PMT)). Filters are used to prevent the light from the laser being directly detected by the PMT, which preferably only sees the luminescence from the $Al_2O_3$ crystal.

FIG. 1 contains a preferred hardware arrangement suitable for use with the instant invention. The dosimeter 10 is preferably attached to the distal end of a fiber optic cable 12 and is placed within the radiation field in preparation for application of the methods disclosed herein. The dosimeter is stimulated during irradiation with light from the light source 14 which is preferably monochromatic light from a laser light source. The illuminating light preferably passes through the beam splitter 16 and is coupled to the fiber cable via coupler 18 and the translation stage 20. Luminescence from the dosimeter is preferably transported back along the same fiber cable and is preferably reflected by the dichroic beamsplitter into the PMT 22 via filters 24. The laser stimulation is preferably timed via operation of optical shutter 26.

As was discussed previously, the luminescence signal observed during the laser stimulation period is typically made up of the sum of the OSL signal, plus any signals due to radioluminescnce (RL) and Cerenkov irradiation (CkL). The latter two signals arise from both the sample and the optical fiber cable. In the periods when no laser stimulation is applied, the luminescence signal is RL+CkL only. Thus, the OSL signal may be isolated by subtraction of the (RL+CkL) during the illumination-off period, from the (OSL+RL+CkL) signal during the illumination-on period.

Figure 2:
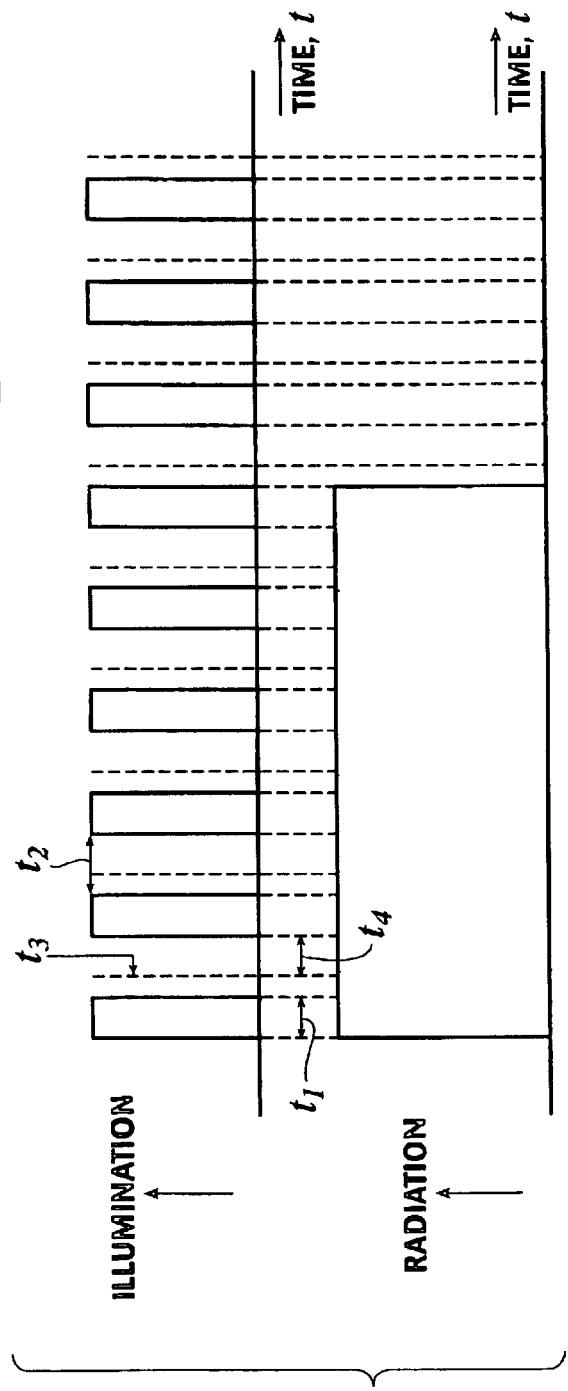
FIG. 2 contains a schematic of a illumination timing sequence suitable for use with the instant invention.

A preferred schematic timing sequence suitable for exploiting this observation is illustrated in FIG. 2. The illumination is modulated with pulses of width $t_1$ (illumination-on period), and with illumination-off periods $t_2$. The illumination-off period consists of a delay period $t_3$ and a measurement period $t_4$. The delay period $t_3$ is necessary to allow for the fluorescence and phosphorescence induced during the illumination-on period to decay before the background RL and CkL signals are measured. The difference between the photodetector signals measured during periods $t_1$ and $t_4$ gives the desired signal due to OSL. If the modulated illumination continues beyond the end of the irradiation period, a decreasing OSL signal is observed. From such data the percentage OSL decrease during each illumination period can be determined. The time on and off periods are preferably selected based at least in part on the speed of the time response of the luminescence signal from the detector, and the desired dose measurement speed (i.e. time between individual dose measurements) for the particular application.

Preferred Methods of Estimation

Figure 3:
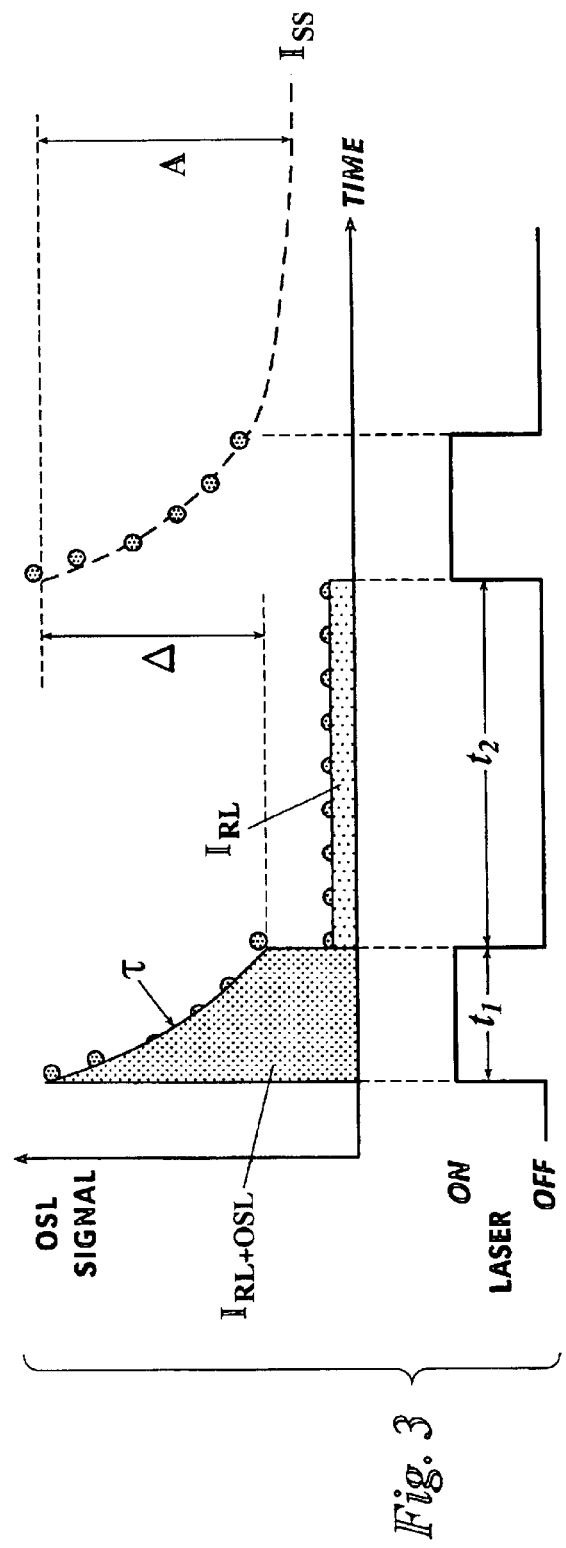
FIG. 3 contains a schematic illustration of the OSL (+RL) signal obtained during periodic stimulations of the sample (of time $t_1$), with each stimulation separated by time $t_2$.

As an example, in FIG. 3 the data points represent either OSL+RL+CkL (during the stimulation pulses) or RL+CkL only (between the pulses). By subtracting the integrated RL+CkL signal (called $I_{RL}$ in the figure) (preferably normalized over the same time interval) from the integrated OSL+RL+CkL signal ($I_{RL+OSL}$), the integrated OSL ($I_{OSL}$) only can be obtained.

Figure 4:
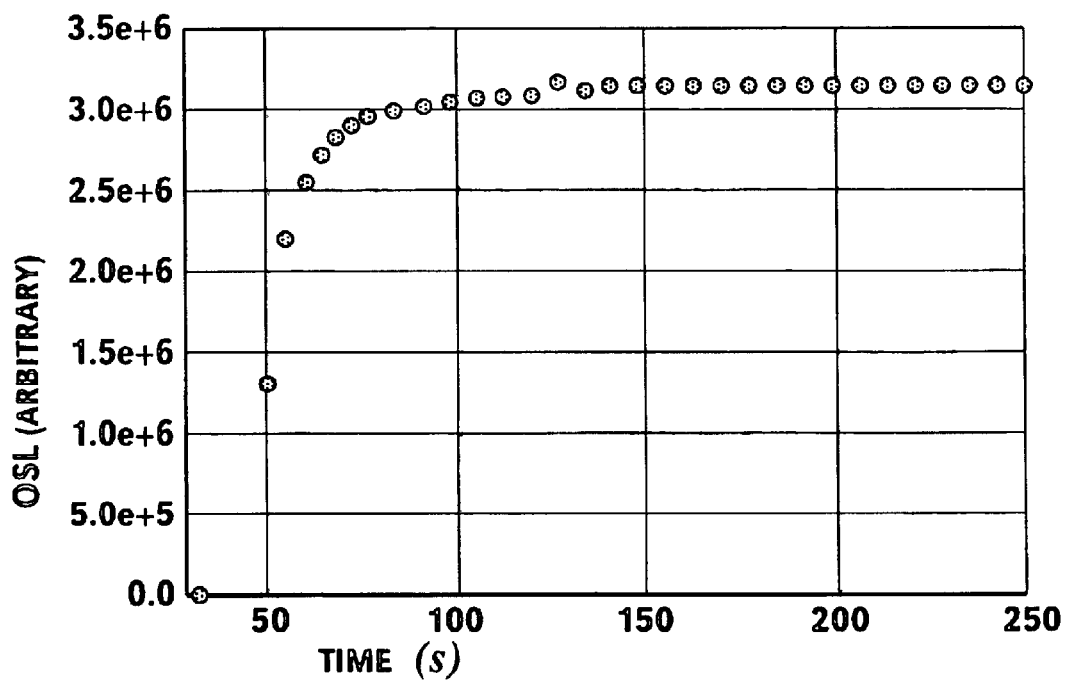
FIG. 4 contains a plot of integrated OSL($I_{RL+OSL} - I_{RL}$) as a function of time.
Figure 6:
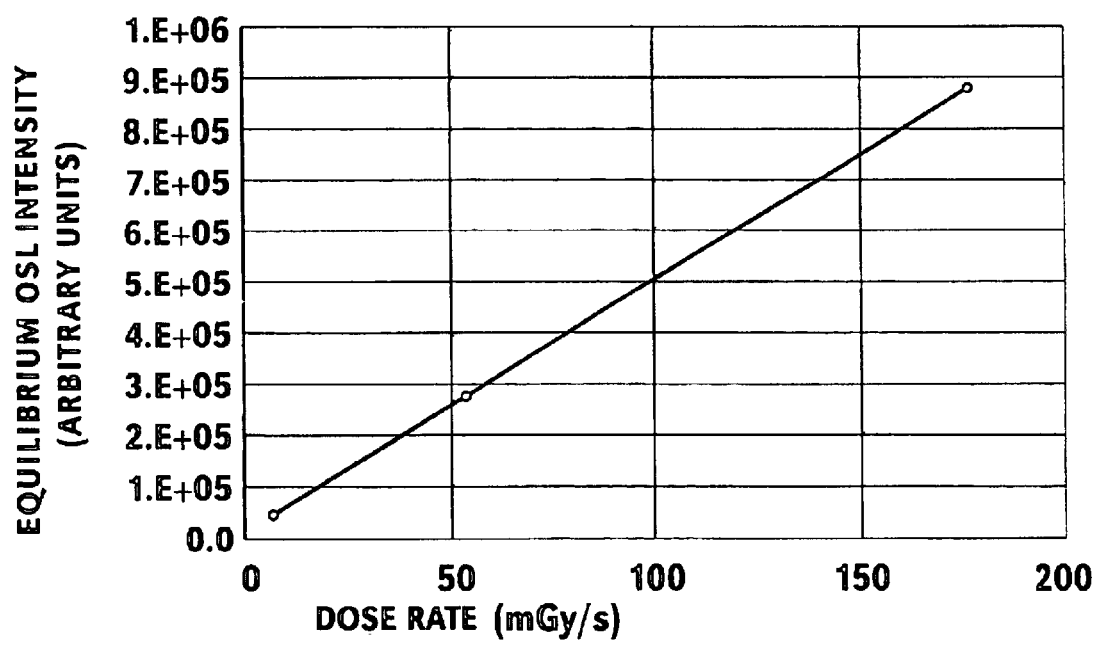

Turning now to a first preferred embodiment of the instant invention, there is provided a method of real-time determination of the dose rate during irradiation using OSL that utilizes the quasi-equilibrium OSL intensity ($I_{OSL}$) with periodic stimulation during continuous irradiation. An example integrated OSL curve collected during such an irradiation program is shown in FIG. 4. As might be expected, a rise to a steady-state level is observed. Further, and as is made clearer in FIG. 5, the intensity of the steady-state level is dependent on the dose rate to which the dosimeter is exposed, with the quasi-equilibrium (steady state level) increasing as the dose rate increases. FIG. 6 contains example data that illustrate the variation of the steady state level with dose rate.

Figure 5:
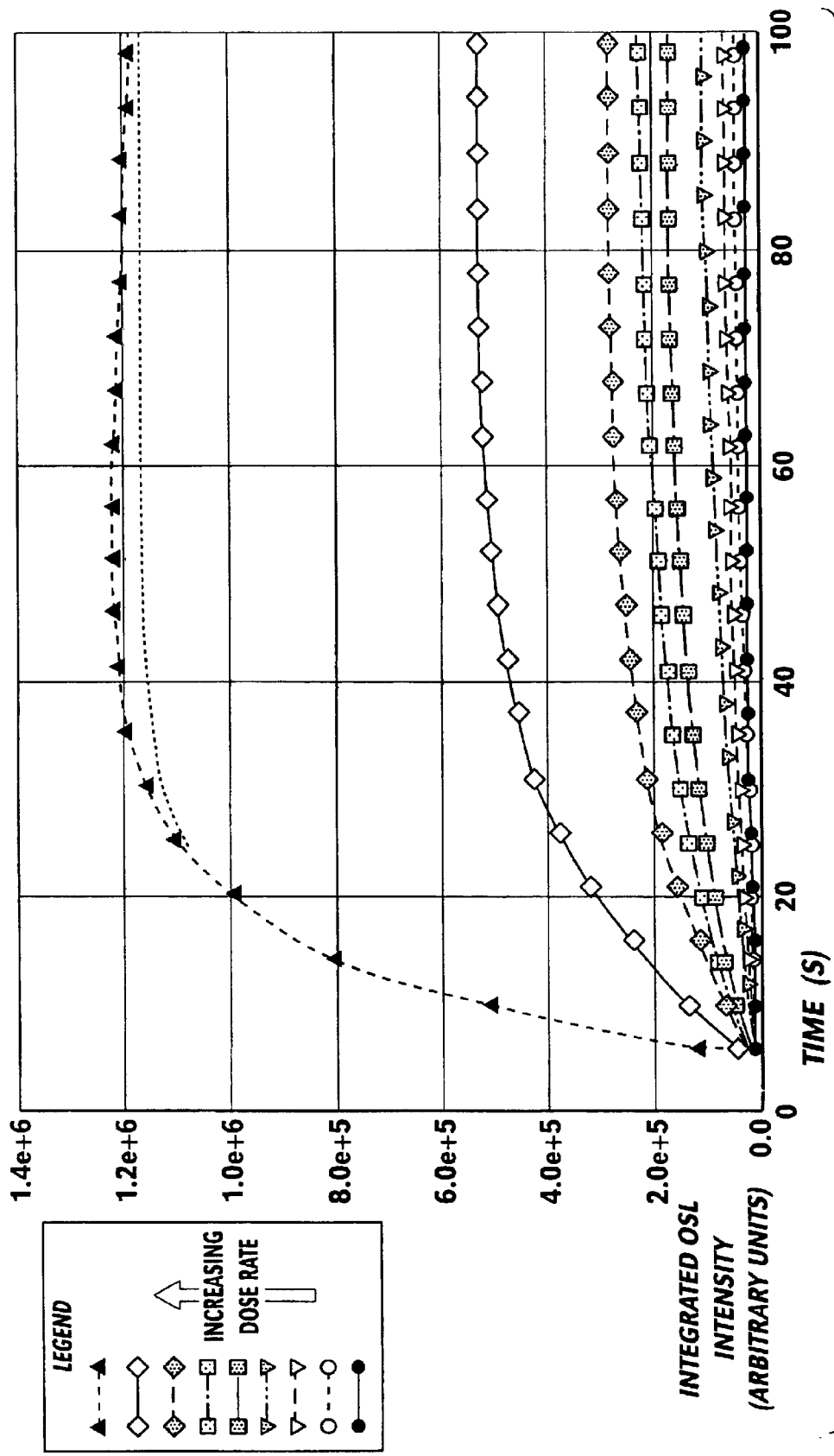
FIG. 5 illustrates integrated OSL as a function of irradiation time, for various dose rates FIG. 6 contains example data that illustrate the variation of the steady state level with dose rate.

To examine in greater detail the dependence of the integrated OSL curve on dose rate, the curve of FIG. 4 was reproduced for a variety of different rates. As can be seen in FIG. 5, the initial rate of assent and the asymptotic/steady-state behavior of the integrated dose curve are seen to be highly dependent on the dose rate. As is further indicated in this figure, in each case a slow rise to a steady-state level is observed and the resulting steady-state level ($I_{SS}$) is proportional to dose rate.

According to another preferred embodiment, there is provided a method of real-time determination of the dose rate of a dosimeter. However, this variation utilizes the amplitude (A) of the transient OSL signal during periodic stimulation to estimate the dose, the amplitude of the transient OSL signal being proportional to the dose with the constant of proportionality preferably being empirically determined.

Figure 7:
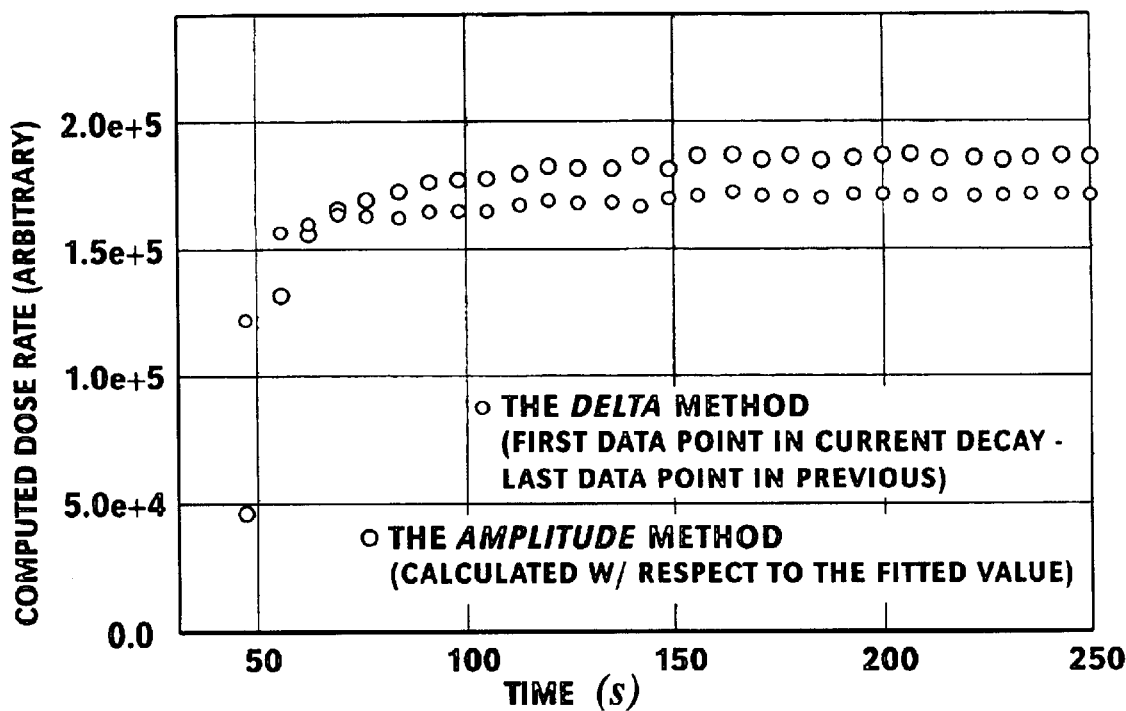
FIG. 7 contains a comparison of the time dependence of the amplitude A and of the difference Δ.

In the present embodiment, instead of integrating the OSL+RL signal and subtracting from it the integrated RL signal from the adjacent period, the RL signal can be removed by calculating the amplitude A, shown in FIG. 3. This difference is calculated in practice by subtracting the OSL+RL level at the end of the stimulation period from the OSL+RL level at the start of the stimulation period. After the decay curve has reached its steady state, the RL contributes an equal amount at each data point and therefore the calculated amplitude A represent the OSL signal only. The amplitude A is proportional to the dose delivered during the laser-off period ($t_2$) and thus the dose rate is determined from $A/t_2$. FIG. 7 shows the result of this calculation for each OSL measurement following the start of the irradiation.

According to still another preferred embodiment, there is provided a method of real-time determination of radiation dose rate that utilizes the difference ($\Delta$) between the OSL intensity at the end of one stimulation period and the beginning of the next as a parameter in the calculation of the dose rate. Here, $\Delta$ is also proportional to the dose delivered in period $t_2$ (with the constant of proportionality preferably being preferably determined empirically), and thus the dose rate is taken to be proportional to $\Delta/t_2$. FIG. 7 shows the result of this calculation for each OSL measurement following the start of the irradiation.

One difference between the amplitude (A) and the difference ($\Delta$) methods is that whereas A reaches a constant value only when the system has reached steady-state, in principle $\Delta$ does not require steady-state to be reached before it attains a constant value. This is because $\Delta$ depends only on the dose delivered during the stimulation off period whereas A only achieves this proportionality only at steady-state. This concept is illustrated in FIG. 7 where dose rate estimates calculated from the parameter Δ are compared with dose rates calculated from the parameter A. It can clearly be seen that the dose rate determination based on Δ becomes constant before the determination based on A, and before the system has attained steady-state.

Finally, there is provided still another preferred embodiment wherein the time constant (τ) is monitored for the return of the transient OSL signal to equilibrium, following either a change in dose rate or during a periodic optical stimulation.

Figure 8:
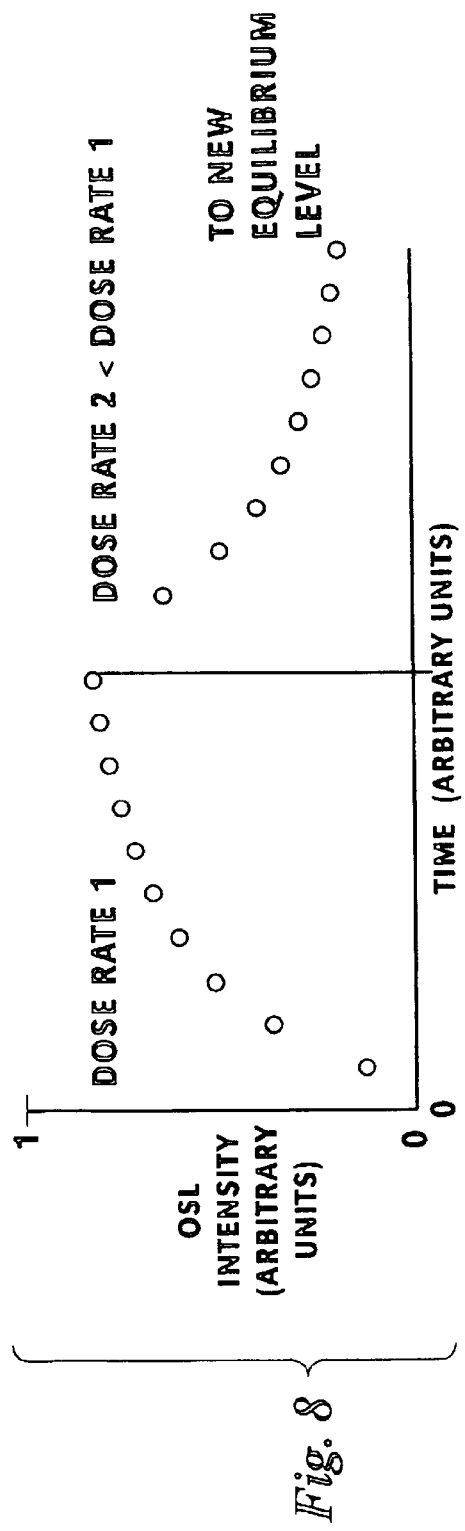
FIG. 8 contains a schematic illustration of the evolution of the OSL signal due to changes in the dose.
Figure 9:
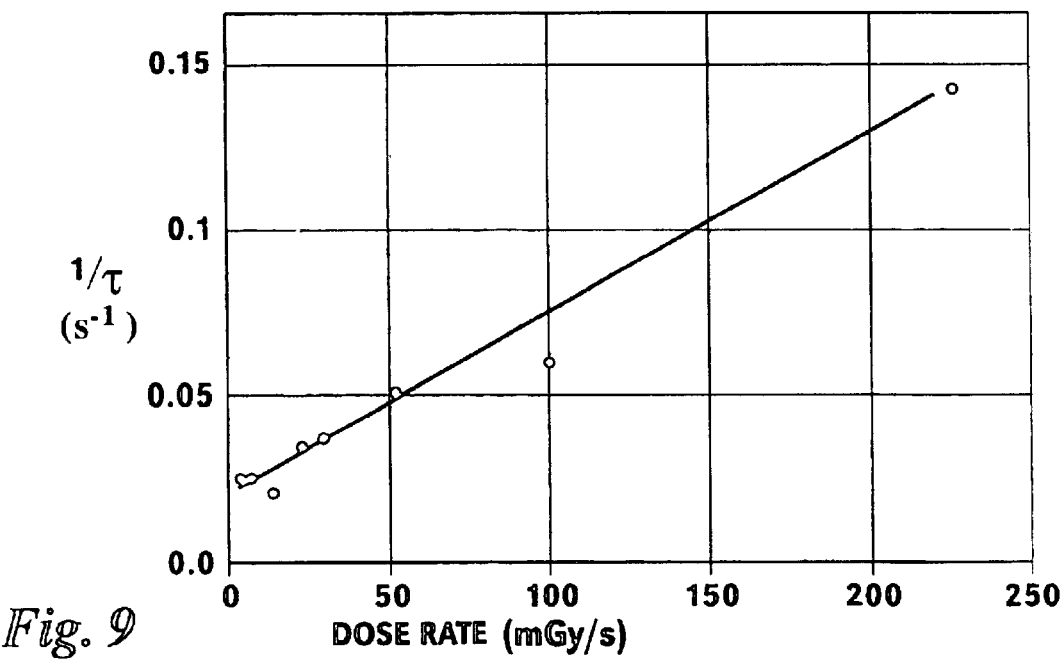
FIG. 9 illustrates an empirically obtained example of the variability in the time constant as a function of dose rate.

More particularly, the dose rate can be determined from the time constant of the growth of the integrated OSL signal to steady state. Thus, the fact that the equilibrium integrated OSL changes with the changing does rate suggests that one can follow the return to equilibrium and monitor the time constant required for this, as illustrated schematically in FIG. 8. For example, by reference to FIG. 5, it may be observed that the speed with which the quasi-equilibrium (steady-state) level is reached increases as the dose rate increases. The speed may be defined by the time constant for the growth of the OSL signal. This in turn may be determined by fitting the OSL-versus-time data to a conventional functional form such as $$I_{OSL} = I_{ss}[1 - e^{-t/\tau}]$$

where $I_{OSL}$ is the integrated OSL signal and $I_{ss}$ is the final steady state/quasi-equilibrium level. The time constant τ extracted in this way is seen to be inversely proportional to the dose rate. Example data are given in FIG. 9.

Once again, it should be noted that it is not necessary to wait for equilibrium to be established in order to extract the value of the time constant from the fit, although clearly the more data points in the fit the better the accuracy of the parameters extracted.

Thus, it should be clear that it is possible to determine the dose rate by monitoring the time constant for the system to regain equilibrium following a perturbation from equilibrium by either optical stimulation a change in dose rate.

CONCLUSIONS

Although the instant disclosure has been focused for the most part on the use of OSL to estimate dose rate, those of ordinary skill in the art will recognize that the same techniques could be used to estimate the cumulate radiation dose. Thus, in the claims that follow, the terms "radiation parameter" and "radiation dose parameter" will be used in their broadest sense to refer to radiation dose, rate of irradiation, or energy absorbed from the radiation field, rate of energy absorption from the radiation field, etc.

It should be noted that when the term "OSL" is used herein, that term should be broadly construed to cover any OSL variant including, without limitation, CW-OSL (i.e., continuous wave OSL), POSL (i.e., pulsed OSL), etc. Those of ordinary skill in the art will recognize that, whatever the mode illumination, the methods of the instant invention will operate similarly.

Additionally, it should be understood that the instant method is particularly suited for use where the radiation dose rate is changing in time. As a consequence, when a radiation parameter is estimated, it should be understood that this could be a time-varying quantity and that successive re-measurement or redetermination of such parameter may yield different values due to changes in the underlying radiation source intensity.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of determining a radiation parameter of a sample via OSL comprising the steps of:
   (a) irradiating said sample;
   (b) simultaneously with said irradiation, illuminating said sample with a light source for a predetermined time period, said light source containing light of at least one predetermined frequency therein;
   (c) during said period of illumination, measuring at least one luminescence from said sample;
   (d) performing steps (b) and (c) at least twice, thereby obtaining a plurality of luminescence values;
   (e) determining from said luminescence values an estimate of a quasi-equilibrium value; and,
   (f) using said estimate of a quasi-equilibrium value to determine said radiation parameter.

2. A method of determining a radiation parameter of a sample via OSL according to claim 1, wherein said radiation parameter is a radiation dose rate.

3. A method of determining a radiation parameter of a sample via OSL according to claim 1, wherein said sample is a single crystal $Al_2O_3$ dosimeter.

4. A method of determining a radiation parameter of a sample via OSL according to claim 1, wherein step (f) comprises the step of:
   (f1) determining a constant of proportionality for relating said estimate of a quasi-equilibrium value and said radiation parameter, and,
   (f2) using said constant of proportionality and said estimate of a quasi-equilibrium value to determine said radiation parameter.

5. A method of determining a radiation parameter of a sample via OSL comprising the steps of:
   (a) irradiating said sample;
   (b) simultaneously with said irradiation, illuminating said sample with a light source for a predetermined time period, said light source containing light of at least one predetermined frequency therein;
   (c) during said period of illumination, measuring at plurality of luminescences from said sample, thereby obtaining a plurality of luminescence values;
   (d) determining from any of said luminescence values an initial luminescence value;
   (e) determining from any of said luminescence values an ending luminescence value; and,
   (f) determining said radiation parameter using at least said initial luminescence value and said ending luminescence value.

6. A method of determining a radiation parameter of a sample via OSL according to claim 5, wherein said radiation parameter is a radiation dose rate.

7. A method of determining a radiation parameter of a sample via OSL according to claim 5, wherein said sample is a single crystal $Al_2O_3$ dosimeter.

8. A method of determining a radiation parameter of a sample via OSL according to claim 5, step (f) comprises the steps of:

(f1) calculating a value representative of a difference between said initial luminescence value and said ending luminescence value, and, (f2) determining said radiation parameter using at least said calculated difference between said initial luminescence value and said ending luminescence value.

9. A method of determining a radiation parameter of a sample via OSL comprising the steps of:

(a) irradiating said sample;

(b) simultaneously with said irradiation, illuminating said sample with a light source for a first time period, said light source containing light of at least one predetermined frequency therein;

(c) during said first time period of illumination and proximate to an end thereof, measuring at least one luminescence from said sample, thereby obtaining an ending luminescence value;

(d) simultaneously with said irradiation and following said first time period of illumination, illuminating said sample with said light source for a second time period;

(e) during said second time period of illumination and proximate to a beginning thereof, measuring at least one luminescence from said sample, thereby obtaining a beginning luminescence value; and, (f) determining said radiation parameter at least from said beginning and said ending luminescence values.

10. A method of determining a radiation parameter of a sample via OSL according to claim 9, wherein said radiation parameter is a radiation dose rate.

11. A method of determining a radiation parameter of a sample via OSL according to claim 9, wherein said sample is a single crystal $Al_2O_3$ dosimeter.

12. A method of determining a radiation parameter of a sample via OSL according to claim 9, step (f) comprises the steps of:

(f1) calculating a value representative of a difference between said ending luminescence value and said beginning luminescence value, and, (f2) determining said radiation parameter using at least said calculated difference between ending luminescence value and said beginning luminescence value.

13. A method of determining a radiation parameter of a sample via OSL comprising the steps of:

(a) irradiating said sample;

(b) simultaneously with said irradiation, illuminating said sample with a light source for a predetermined time period, said light source containing light of at least one predetermined frequency therein;

(c) during said predetermined time period of illumination, measuring at least one luminescence from said sample, thereby obtaining at least one luminescence value;

(d) performing steps (b) and (c) until a plurality of luminescence values have been obtained;

(e) selecting at least two of said luminescence values;

(f) calculating a time constant from said selected luminescence values; and, (g) determining from said time constant said radiation parameter of said sample.

14. A method of determining a radiation parameter of a sample via OSL according to claim 13, wherein said radiation parameter is a radiation dose rate.

15. A method of determining a radiation parameter of a sample via OSL according to claim 13, wherein said sample is a single crystal $Al_2O_3$ dosimeter.

16. A method of determining a radiation parameter of a sample via OSL according to claim 13, step (f) comprises the steps of:

(f1) calculating a time constant from said selected luminescence values according to an equation $I_{OSL}=I_{ss}[1-e^{-t/\tau}]$, wherein $\tau$ is said time constant, $I_{OSL}$ is an integrated OSL signal, and $I_{ss}$ is a final steady state level of integrated OSL signal.

17. A method of determining a radiation parameter of a sample via OSL comprising the steps of:

(a) irradiating said sample;

(b) simultaneously with said irradiation, illuminating said sample with a light source for a predetermined time period, said light source containing light of at least one predetermined frequency therein;

(c) during said predetermined time period of illumination, measuring at least one luminescence from said sample, thereby obtaining at least one luminescence value;

(d) performing steps (b) and (c) at least until sufficient luminescence values are obtained to estimate a value representative of a steady state luminescence value for said sample;

(e) calculating said value representative of said steady state luminescence value using any of said luminescence values; and, (f) using at least said value representative of said steady state luminescence value to determine said radiation parameter.

18. A method of determining a radiation parameter of a sample via OSL according to claim 17, wherein said radiation parameter is a radiation dose rate.

19. A method of determining a radiation parameter of a sample via OSL according to claim 17, wherein said sample is a single crystal $Al_2O_3$ dosimeter.

20. A method of determining a radiation parameter of a sample via OSL according to claim 17, wherein step (e) comprises the steps of:

(e1) determining from said luminescence values said steady state luminescence value.

21. A method of determining a radiation parameter of a sample via OSL according to claim 17, wherein step (e) comprises the steps of:

(e1) calculating a time constant from said luminescence values according to an equation $I_{OSL}=I_{ss}[1-e^{-t/\tau}]$, wherein $\tau$ is said time constant, $I_{OSL}$ is an integrated OSL signal, and $I_{ss}$ is a final steady state level of said integrated OSL signal, said time constant being a value representative of said steady state luminescence value.

22. A method of determining a radiation parameter of a sample via OSL according to claim 17, wherein said value representative of said steady state luminescence value is said steady state luminescence value.

* * * * *